(12) United States Patent
Terry

(10) Patent No.: US 8,840,244 B2
(45) Date of Patent: Sep. 23, 2014

(54) EYEGLASSES AND ORNAMENTAL RETAINER FOR USE IN CONJUNCTION THEREWITH

(71) Applicant: Jayne Terry, Wellesley, MA (US)

(72) Inventor: Jayne Terry, Wellesley, MA (US)

( * ) Notice: Subject to any disclaimer, the term of this patent is extended or adjusted under 35 U.S.C. 154(b) by 0 days.

(21) Appl. No.: 13/762,463

(22) Filed: Feb. 8, 2013

(65) Prior Publication Data

US 2014/0226122 A1 Aug. 14, 2014

(51) Int. Cl.
*G02C 3/00* (2006.01)
*G02C 5/14* (2006.01)

(52) U.S. Cl.
CPC ............... *G02C 3/006* (2013.01); *G02C 5/143* (2013.01)
USPC .......................................... 351/157; 351/121

(58) Field of Classification Search
CPC .......... G02C 3/00; G02C 3/006; G02C 11/00; G02C 11/02; G02C 5/143
USPC ....................... 351/51, 52, 156–158, 111, 121
See application file for complete search history.

(56) References Cited

U.S. PATENT DOCUMENTS

| | | | |
|---|---|---|---|
| 2,023,523 A | 10/1935 | Grimball | |
| 2,494,750 A | 1/1950 | Fornicoia | |
| 2,798,409 A | 7/1957 | Speers | |
| 3,728,012 A | 4/1973 | Downey | |
| 4,603,951 A | 8/1986 | Beck et al. | |
| 4,761,068 A | 8/1988 | Star | |
| 4,976,531 A | 12/1990 | Kahaney | |
| 5,005,263 A * | 4/1991 | Barrett | 24/3.3 |
| 5,655,263 A | 8/1997 | Stoller | |
| D392,990 S | 3/1998 | Hall et al. | |
| 5,786,882 A | 7/1998 | Satterthwaite | |
| 6,092,897 A | 7/2000 | Smerdon, Jr. | |
| 6,520,635 B1 * | 2/2003 | Ignatowski | 351/52 |
| 6,629,760 B1 | 10/2003 | Razin | |
| 6,905,206 B2 | 6/2005 | Skuro | |
| 7,581,834 B1 | 9/2009 | Courville | |
| 2005/0108855 A1 | 5/2005 | Wolf | |
| 2012/0291233 A1 * | 11/2012 | Wilkinson | 24/302 |

FOREIGN PATENT DOCUMENTS

CA 2583100 9/2007

* cited by examiner

*Primary Examiner* — Huy K Mai
(74) *Attorney, Agent, or Firm* — Kriegsman & Kriegsman

(57) ABSTRACT

A retainer is releasably secured to a pair of eyeglasses that includes flattened and widened temple members. Each temple member includes a heart-shaped hole at its distal end that serves as the point of attachment for the retainer. The retainer includes a pair of selectively enclosable lobster claw clasps that are coupled to opposite ends of an elongated, highly ornamental necklace. Each clasp includes a C-shaped hooked portion and an articulating finger pivotally coupled thereto, with pivotal displacement of the finger allowing for selective enclosure of the hooked portion. When secured to the glasses, the retainer applies no discomfort to the user since the clasp can rest on the elongated part of the heart-shaped hole. The means for attaching the retainer to the eyeglasses is not only strong and secure but also aesthetically pleasing and can be easily changed to suit the attire of the user.

10 Claims, 4 Drawing Sheets

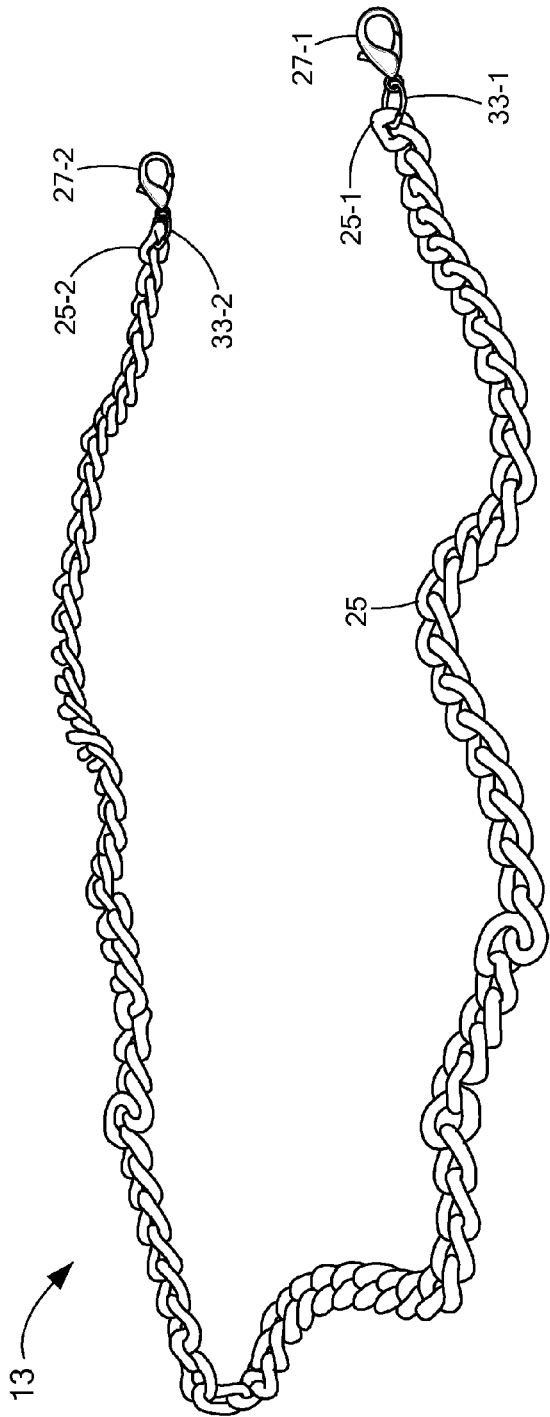
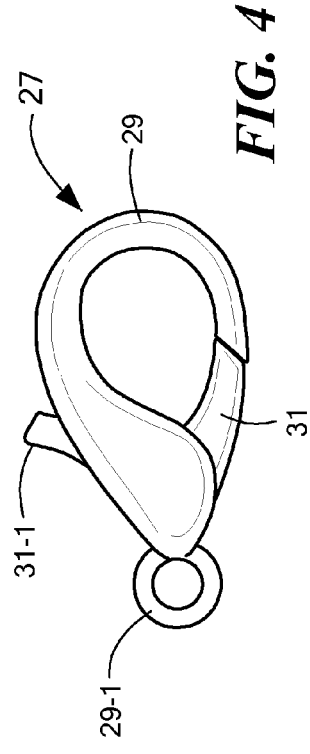

EYEGLASSES AND ORNAMENTAL RETAINER FOR USE IN CONJUNCTION THEREWITH

FIELD OF THE INVENTION

The present invention relates generally to eyewear and more particularly to retaining devices that enable a pair of eyeglasses to be worn around the neck of a person when not being used and can be easily changed at will to suit the attire of the user.

BACKGROUND OF THE INVENTION

Eyewear, such as eyeglasses, sunglasses, reading glasses and the like, are often taken on and off by a user in a repetitive fashion over the course of a day. This repeated pattern of wearing and subsequently removing eyewear from the head of the user renders the glasses highly susceptible to unintentional misplacement, which is highly undesirable.

Accordingly, retainers are often secured to glasses to prevent the likelihood of inadvertent misplacement, these retainers being commonly referred to in the art as eyeglass retainers, straps, chains, necklaces or bands. One type of eyeglass retainer which is well-known in the art includes an elongated cord, often chain-like, beaded or otherwise decorative in nature, with means at each of its ends for releasable connection to a corresponding temple member, or arm, of an eyeglass frame. In this capacity, the retainer serves to effectively connect, or enclose, the distal ends of the pair of temple members. When the eyeglasses are being worn, the cord is designed to hang loosely behind the head of the user. However, with the eyeglasses removed, the cord wraps partially around the back of the user's neck and enables the eyeglasses to hang freely against the user's chest until further use is required, thereby eliminating the risk of unintentional misplacement.

Different means for releasably connecting each end of traditional eyeglass straps to the frame of a pair of eyeglasses are known in the art.

As a first connection means, each end of the retainer is often provided with a partially open, C-shaped, clasp that is dimensioned to hook through a small, circular opening formed in the distal end of each frame arm. An example of an eyeglass strap that is provided with a pair of partially open, hook-shaped clasps is shown in U.S. Pat. No. 2,023,523, the disclosure of which is incorporated by reference.

As a second connection means, each end of the retainer is often provided with a looped fitting that is constructed out of an elastic material, such as rubber. In use, the looped fitting is fittingly slid over the distal end of each temple member of the eyeglasses frame, with a collar often designed to slide axially over the fitting to releasably cinch the loop tightly around its corresponding temple member. An example of an eyeglass strap that is provided with looped fittings is shown in U.S. Patent Application Publication No. 2005/010885 to S. Wolf, the disclosure of which is incorporated by reference.

Although well-known and widely used in the art, retainers of the type that rely upon partially open clasps or looped fittings to allow for releasable connection to a pair of eyeglasses have been found to suffer from a number of notable drawbacks.

As a first drawback, both of the aforementioned means for releasably coupling the ends of an eyeglass strap to a corresponding frame arm of a pair of glasses have been found to be highly unreliable with respect to its connective integrity. This connective unreliability, in turn, frequently results in unintentional decoupling of the retainer from the frame, often unknowingly to the user, thereby resulting in a greater likelihood of losing the eyeglasses, which is highly undesirable.

As a second drawback, both of the aforementioned means for releasably coupling the ends of an eyeglass strap to a corresponding frame arm of a pair of eyeglasses introduce a significant, visibly unattractive component to the retainer. In fact, the use of traditional eyeglass retainers is typically limited to office and residential settings because it is widely regarded that conventional retainers fashionably detract from overall style of their wearers.

As a third drawback, both of the aforementioned means for releasably coupling the ends of an eyeglass strap to a corresponding frame arm of a pair of glasses often create discomfort to the wearer. In particular, an eyeglass retainer that utilizes a pair of looped fittings that slide over the distal ends of eyeglass frame arms generally positions the fittings in direct contact against the user (e.g., directly against the temples or the back of the ears of the wearer). This direct contact established between the looped fittings and the wearer is often found to be uncomfortable when maintained over a prolonged period of time.

To prevent inadvertent separation, retainers are often constructed to be permanently connected to a pair of eyeglasses. For instance, in U.S. Pat. No. 2,798,409 to R. Speers, the disclosure of which is incorporated by reference, there is shown a safety support for eyeglasses that includes an elongated ribbon that is permanently secured to the temple members of a pair of glasses by inserting each end of the ribbon through an opening formed in a corresponding temple member and, in turn, forming a knot. Similarly, in U.S. Pat. No. 3,728,012 to D. Downey, the disclosure of which is incorporated herein by reference, there is shown an eyeglass retainer in the form of an elongated strand that is dimensioned for insertion through an opening formed in each temple member of a pair of eyeglasses, each end of the strand being shaped to include an enlarged knob to prevent dissociation of the retainer from the eyeglasses.

Although useful in preventing the inadvertent misplacement of glasses, eyeglass straps that rely upon permanent means of connection to a frame are often disfavored due to their relatively conspicuous, unfashionable nature. As can be appreciated, it has been found that users prefer the ability to remove a retainer from a pair of eyeglasses in certain situations.

In view of the aforementioned shortcomings associated with traditional eyeglass retainers, alternative means for securing eyeglasses on a person are currently available in the marketplace.

One alternative means for retaining glasses on a person utilizes a hook-shaped clip that is secured to an article of the person's clothing, such as shirt pocket. The hook-shaped clip is affixed to the outer surface of the article of clothing using a complementary magnetic component that is disposed against the inner surface of the clothing in alignment therewith. Accordingly, when not being used, the eyeglasses are disposed in a folded condition and, in turn, are hung onto the exposed, hook-shaped clip.

Another alternative means for retaining glasses on a person utilizes a lanyard that hangs around the neck of the wearer. The lanyard includes an enlarged ring that rests against the chest of the user. Accordingly, when not being used, the eyeglasses are disposed in a folded condition and, in turn, are hung onto the enlarged ring.

Although well-known in the art, both of the above-described means for retaining eyeglasses on a person suffer from notable drawbacks. Most notably, both means require the user to repeatedly fold, hang, unhang and unfold the eyeglasses during routine use, which is rather time-consuming and complex in nature. Furthermore, both means are typically regarded as visibly unattractive and thereby fashionably detract from the overall style of the wearer.

Although there are a variety of different eyeglass retainers available in the marketplace today, the inventor is not aware of any existing eyeglass retainer arrangement with a secure, reliable and easily interchangeable mechanism that provides quick and easy access to the eyeglasses in a ready-to-use position, that is also aesthetically appealing and does not cause irritation to the skin of the wearer.

This being said, there remains a need for an eyeglass retainer arrangement that is comfortable and highly reliable with respect to its connective integrity, that presents an attractive look and provides users with quick access to their eyeglasses in a ready-to-use position, and that offers a released connection that can be quickly changed at will to suit the attire of the user.

BRIEF SUMMARY OF THE INVENTION

It is an object of the present invention to provide a new and improved eyeglass retainer that can be releasably connected to a pair of eyeglasses in a secure manner, the retainer including a necklace that can be easily interchanged to suit the attire of the user and that can also serve as a fashionable adornment.

It is still another object of the present invention to provide an eyeglass retainer as described above that is an aesthetically pleasing fashionable adornment that does not provide discomfort to the user's ears after prolonged use.

Accordingly, this invention is summarized in a retainer arrangement for eyeglasses wherein the width of the eyeglass temples have been widened and flattened, with heart-shaped holes being formed in the flat plastic distal ends of both temples of the eyeglasses. The heart-shaped holes receive and retain opposite end portions of an elongated retaining necklace by the mechanism of two clasps located at the distal ends of the retaining necklace.

An advantage of the present invention is that wider temples provide a steadier and secure means to hold the eyeglasses in the correct position over the eyes of the user.

Another advantage of the present invention is that having heart-shaped holes formed in the temples of the eyeglasses eliminate the need for bulky or obtrusive connecting mechanisms typically necessary for retaining devices. In addition, the shape of the hole itself provides ample sliding room for the clasp to avoid direct contact with the wearer, thereby avoiding discomfort to the user's ears.

Yet another advantage of the present invention is that the two heart-shaped holes provide an easy means for a releasable and secure attachment for the clasps of the retaining necklace, thereby allowing the connection between the eyeglass temples and the retaining necklace to be easily accomplished and interchanged.

An additional advantage of the present invention is that relatively unobtrusive heart-shaped holes can be formed in conventional flat plastic temple ends at low cost during molding of the temples ends or later after manufacture without unduly degrading the aesthetic appearance of the eyeglasses.

Various other features and advantages will appear from the description to follow. In the description, reference is made to the accompanying drawings which form a part thereof, and in which is shown by way of illustration, an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts:

FIG. 3 is a side perspective view of the ornamental retainer, the retainer being enlarged to illustrate its necklace and lobster-claw clasps;

FIG. 4 is an enlarged, side perspective view of one of the lobster-claw clasps shown in FIG. 3.

DETAILED DESCRIPTION OF THE INVENTION

Construction of Eyeglasses 11 and Ornamental Retainer 13

Figure 1:
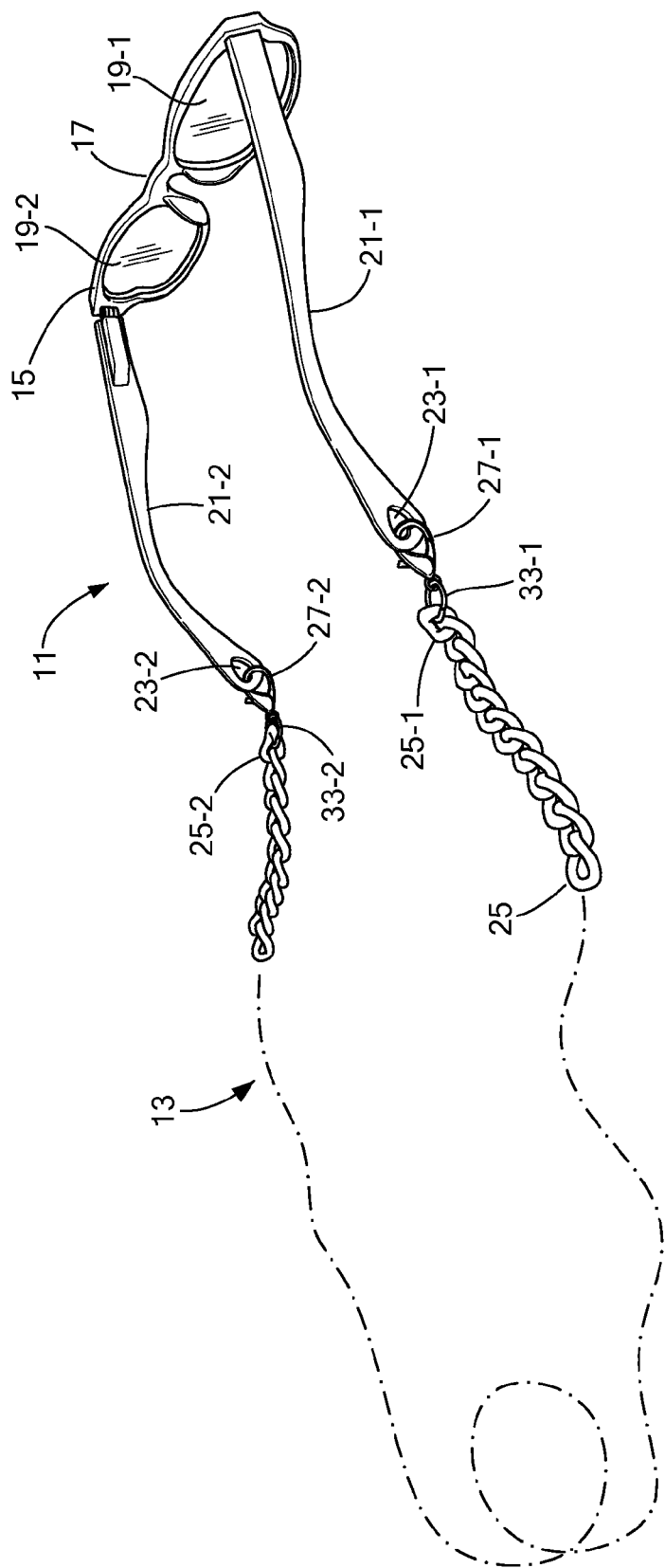
FIG. 1 is a side perspective view of the combination of a pair of eyeglasses and an ornamental retainer for use in conjunction therewith, the pair of eyeglasses and the retainer being constructed according to the teachings of the present invention, the retainer being shown connected to the pair of glasses.

Referring now to FIG. 1, there is shown a pair of eyeglasses and an ornamental retainer for use in conjunction therewith, the pair of eyeglasses being constructed according to the teachings of the present invention and identified generally by reference numeral 11 and the retainer being constructed according to the teachings of the present invention and identified generally by reference numeral 13. As will be described in detail below, retainer 13 is designed to be releasably connected to eyeglasses 11 in a secure, reliable manner and thereby enable eyeglasses 11 to be hung around the neck of a person when not being worn. In addition, it is envisioned that retainer 13 could serve as a fashion accessory, or adornment, that is selected for use with eyeglasses 11 to match the particular style of clothing and/or jewelry worn by the user.

In the present embodiment, eyeglasses 11 are represented as a pair of reading glasses. However, it is to be understood that eyeglasses 11 are not limited to reading glasses. Rather, as defined herein, use of the term "eyeglasses" denotes any type of framed eyewear including, but not limited to, sunglasses, goggles and the like.

Figure 2:
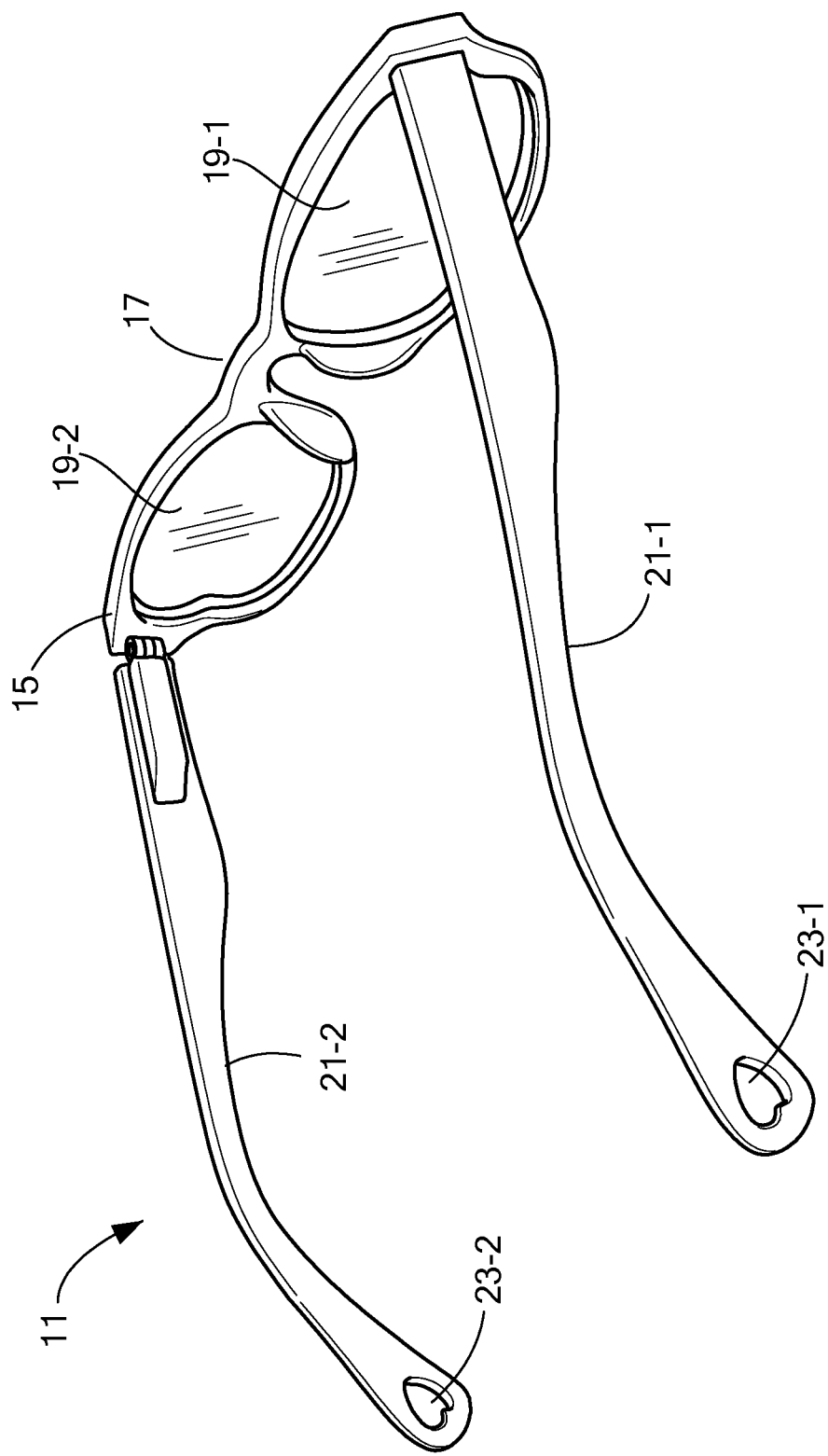
FIG. 2 is a side perspective view of the pair of eyeglasses shown in FIG. 1, the eyeglasses being enlarged to illustrate its widened, flattened temples and heart-shaped holes.

Eyeglasses 11, which is shown in isolation in FIG. 2, comprise a frame 15 that is constructed of a rigid and durable material, such as plastic. Frame 15 includes a unitary, front member 17 that is designed to retain a pair of lenses 19-1 and 19-2. Frame 15 additionally includes a pair of temple members 21-1 and 21-2 that are hingedly connected to opposing sides of front member 17 and extend rearwardly therefrom.

Figure 5:
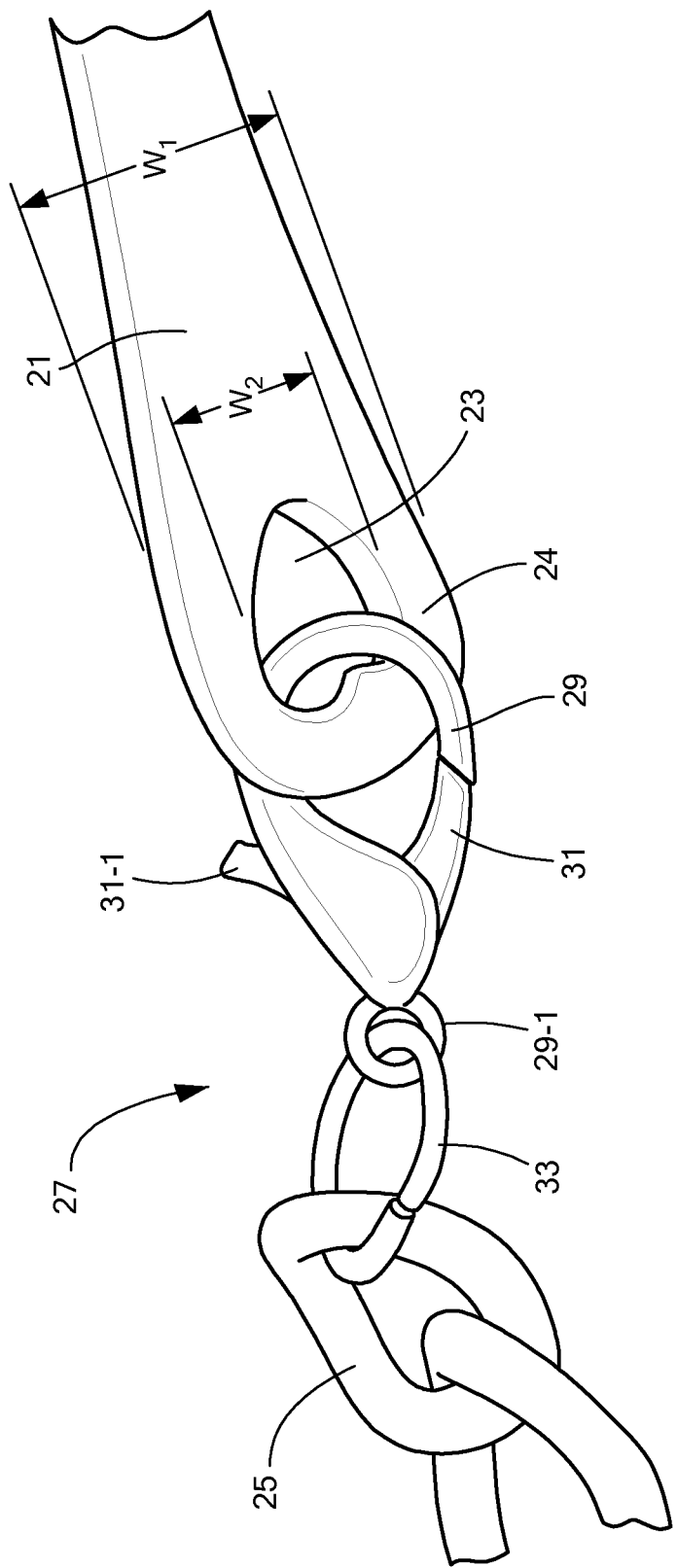
FIG. 5 is an enlarged, side perspective view of the pair of eyeglasses and the retainer shown in FIG. 1.

Temple members 21-1 and 21-2 (also referred to herein as temple bars 21-1 and 21-2 or temple arms 21-1 and 21-2) are shaped to define generally heart-shaped holes 23-1 and 23-2, respectively. As seen most clearly in FIG. 5, each heart-shaped hole 23 is formed at, or otherwise proximate to, the distal, or free, end 24 of its corresponding temple member 21. It is to be understood that each heart-shaped hole 23 can be formed into frame 15 either during the manufacturing process (e.g., by being directly molded into each plastic bar 21) or subsequent thereto (e.g., as part of a separate stamping or punching operation).

It should be noted that each temple member 21 preferably is flattened and has a width $W_1$ of approximately 0.5 inches at its distal end, which is about twice the width of the distal end of the temple arms of a conventional pair of eyeglasses. Similarly, each heart-shaped hole 23 has a width $W_2$ of approximately 0.3125 inches. As will be described further in detail below, the substantially widened distal ends of temple members 21 provide increased comfort and stability to the wearer. In addition, the enlarged, heart-shaped design of each hole 23 not only allows for greater ease in connecting retainer 13 thereto but also maintains retainer 13 in place without imparting any discomfort onto the wearer.

It should also be noted that each temple member 21 is designed such that its corresponding heart-shaped hole 23 is fully enclosed (i.e., completely bounded, or circumscribed, by the material of temple arm 21). As will be described further in detail below, the complete enclosure of each hole 23 prevents unintentional decoupling of retainer 13 therefrom, which is a principal object of the present invention.

The utilization of holes 23 that are heart-shaped in design introduces a number of notable advantages, as will be set forth in greater detail below. However, it is to be understood that frame 15 could be provided with holes of alternative shapes without departing from the spirit of the present invention. Preferably, alternatively shaped holes formed in frame 15 would be uniquely designed to maintain retainer 13 in place without imparting any discomfort onto the wearer (e.g., by similarly incorporating one or more inward projections to limit rotation of retainer 13).

As seen most clearly in FIG. 3, retainer 13 comprises a necklace 25 and a pair of clasps 27-1 and 27-2. As will be described further below, clasps 27 allow for the releasable attachment of retainer 13 to eyeglasses 11.

Necklace 25 is constructed as an elongated, continuous member approximately 28 inches in length that includes a first end 25-1 and a second end 25-2. In the present embodiment, necklace 25 is represented as a metal chain that is highly ornamental in nature. However, it is to be understood that necklace 25 could be constructed out of other styles and types of suitable materials, such as a strap of fabric or a beaded cord, without departing from the spirit of the present invention. In particular, as defined herein, the term "necklace" represents any elongated, continuous, fashionable member that can be worn, or partially wrapped, around the neck of a person and is not limited to any particular style, design or material of product. Accordingly, use of the term "necklace" herein encompasses all varieties of cords, straps, bands, chains, links, strings, strands and the like.

Clasps 27-1 and 27-2 are coupled to ends 25-1 and 25-2 of necklace 25. As seen most clearly in FIG. 4, each clasp 27 is preferably constructed out of a rigid and durable material, such as metal, and includes a generally C-shaped hooked portion 29 to which is pivotally connected a spring-biased, articulating finger 31. Finger 31 is shaped to include an outwardly extending projection 31-1 that serves as an actuation surface for pivoting finger 31 between a first position in which clasp 27 is entirely enclosed, or bounded, (as shown in FIG. 4) and a second position in which clasp 27 is partially opened, or unbounded. As can be appreciated, finger 31 is naturally biased by an internal spring (not shown) into its first position (i.e., to form an enclosed ring-like element) and will remain as such in the absence of a pivotal force applied thereto.

Due to its resemblance to the claw of a lobster, the aforementioned style of clasp 27 is commonly referred to in the art as a "lobster claw clasp." Preferably, each clasp 27 is an oval, silver-plated lobster claw clasp that is at least 20 mm in size, the enlarged size of clasp 27 allowing for ease in connection with frame 15. However, it is to be understood that of lobster claw clasps of alternative sizes (e.g., 25 mm, 30 mm or 33 mm), shapes (e.g., round) and materials (e.g., brass-plated or gold-plated) could be used in place thereof without departing from the spirit of the present invention.

C-shaped hooked portion 29 of each clasp 27 is shown herein comprising a small, integrally formed, enclosed loop 29-1. Referring back to FIG. 3, a pair of enclosed wire rings 33-1 and 33-2 is utilized to connect clasps 27-1 and 27-2 to ends 25-1 and 25-2, respectively, in order to facilitate the manufacture of retainer 13. Specifically, as seen most clearly in FIG. 5, each enclosed ring 33 extends through loop 29-1 in its associated clasp 27 and, in turn, through an opening formed in the corresponding end of chain-like necklace 25. However, it to be understood that retainer 13 could be alternatively constructed without the use of rigid wire rings 33 (e.g., by directly linking each end of necklace 25 with loop 29-1 in its corresponding clasp 27 or by welding said elements together) without departing from the spirit of the present invention.

Use of Retainer 13 with Eyeglasses 11

In use, retainer 13 can be used in conjunction with eyeglasses 11 in the following manner. Specifically, each clasp 27 is connected to distal end 24 of its corresponding temple member 21 by pivoting articulating finger 31 from its first, or closed, position to its second, or open, position. With clasp 27 open, its C-shaped hooked portion 29 can be easily inserted, or linked, through the enlarged, heart-shaped hole 23 in its corresponding temple member 21. After inserting hooked portion 29 through hole 23, the manual pivotal force applied to projection 31-1 is withdrawn, thereby resulting in finger 31 resiliently returning to its naturally-disposed first, or closed, position.

With retainer 13 coupled to eyeglasses 11 in the manner described in detail above, it is important to note that each clasp 27 and each heart-shaped hole 23 defined in its corresponding temple member 21 is entirely closed. Accordingly, with clasp 27 connected to its associated temple member 21, the enclosed nature of the linked-style coupling arrangement results in a highly reliable, secure and strong means of releasable connection, which is a primary object of the present invention.

Having coupled retainer 13 to eyeglasses 11 in the manner set forth above, eyeglasses 11 can be worn in a conventional manner with the majority of chain-like necklace 25 designed to hang loosely behind the head of the user. Because clasps 27 engage heart-shaped holes 23 formed into distal ends 24 of temple members 21, clasps 27 are less likely to contact, and potentially irate, the skin of the user. Furthermore, the inward projection, or point, 23-1 that defines the top of each hole 23 limits movement of its corresponding clasp 27 to further protect the user from any discomfort, which is a principal object of the present invention.

When eyeglasses 11 are removed from being worn, necklace 25 wraps partially around the back of the user's neck and thereby enables eyeglasses 11 to hang freely against the user's chest in an unfolded state until further use is required. In this capacity, glasses 11 cannot be inadvertently separated from the user, which is a principal object of the present invention.

In those circumstances in which the user wishes to decouple retainer 13 from eyeglasses 11 (e.g., in a formal setting), the user can manually pivot finger 31 open (via projection 31-1) and separate clasp 27 from its corresponding temple member 21. When use of retainer 13 is once again required, each clasp 27 can be reconnected to its associated temple member 21 in the manner set forth in detail above.

Features and Advantages of Eyeglasses 11 and Retainer 13

As can be appreciated, the particular construction of eyeglasses 11 and retainer 13 provides a number of notable advantages over traditional means for retaining eyeglasses on a person.

As a first feature of the present invention, the means for coupling each clasp 27 of retainer 13 to an associated distal end 24 of eyeglasses 11 is both (i) highly secure and reliable, due to the closed-loop, linked style of interconnection, and (ii) relatively easy to operate by hand, due to the use of enlarged clasps 27 and holes 23.

As a second feature of the present invention, the particular design of retainer 13 and eyeglasses 11 provides maximized comfort to the wearer. For instance, unlike traditional retainers that slide over a pair of eyeglasses and thereby directly contact the wearer, retainer 13 clasps onto openings formed into the distal end of glasses and, as such, does not directly contact the temple or ears of the wearer. In addition, due to point 23-1 in heart-shaped hole 23, each clasp 27 is less likely to rotate, or otherwise move, in relation to glasses 11, thereby limiting discomfort to the user. Furthermore, the utilization of widened distal ends 24 disperses the contact region of eyeglasses 11 against the user and thereby reduces the likelihood of skin irritation.

As a third feature, the above-described ease in connecting, and subsequently disconnecting, retainer 13 to and from eyeglasses 11 allows for a plurality, or set, of retainers 13 of varying styles to be used with a common pair of eyeglasses 11. For instance, by modifying the color or material of necklace 25, a set of retainers 13 could be interchangeably utilized in connection with eyeglasses 11 to match the particular style of clothing and/or jewelry worn by the user. In this capacity, it is envisioned that each retainer 13 could function actually as a fashion accessory, or adornment, unlike conventional eyeglass retainers that are widely considered as visually unattractive and stylistically detracting.

The embodiment shown in the present invention is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. The combination of:
    (a) a pair of eyeglasses, the pair of eyeglasses comprising,
        (i) a pair of lenses, and
        (ii) a frame, the frame including a front member and a pair of widened and flattened temple members coupled to the front member, the front member being adapted to retain the pair of lenses, each temple member having a distal end that is shaped to define a fully enclosed heart-shaped hole; and
    (b) a retainer, the retainer comprising,
        (i) an elongated necklace having a first end and a second end, and
        (ii) a pair of selectively enclosable clasps, one of the pair of selectively enclosable clasps being coupled to the first end of the elongated necklace and the other of the pair of selectively enclosable clasps being coupled to the second end of the elongated necklace.

2. The combination of claim 1 wherein each of the pair of selectively enclosable clasps is adapted to be releasably linked with a corresponding temple member through the fully enclosed heart-shaped hole.

3. The combination of claim 2 wherein the distal end of each temple member has a width of approximately 0.5 inches.

4. The combination of claim 2 wherein each heart-shaped hole has a width of approximately 0.3125 inches.

5. The combination of claim 2 wherein each of the pair of selectively enclosable clasps is a lobster claw clasp.

6. The combination of claim 5 wherein each of the pair of selectively enclosable clasps is a lobster claw clasp that is at least 20 mm in size.

7. The combination of claim 2 wherein each of the pair of selectively enclosable clasps comprises:
    (a) a hooked portion, and
    (b) an articulating finger pivotally coupled to the hooked portion,
    (c) wherein the articulating finger is adapted to be pivoted between a first position in which the hooked portion is entirely enclosed and a second position in which the hooked portion at least partially open.

8. The combination of claim 7 wherein the hooked portion of each of the pair of selectively enclosable clasps includes an integrally formed, enclosed loop.

9. The combination of claim 8 wherein the retainer further comprises first and second rings, each of the first and second rings being dimensioned to be linked through the enclosed loop in a corresponding clasp.

10. The combination of claim 9 wherein one of the pair of selectively enclosable clasps is connected to the first end of the elongated necklace by the first ring and the other of the pair of selectively enclosable clasps is connected to the second end of the elongated necklace by the second ring.

* * * * *